United States Patent [19]

Bodnar

[11] Patent Number: 4,597,478

[45] Date of Patent: Jul. 1, 1986

[54] RATCHETING TOOL WITH IMPROVED SUPPORT FOR DRIVEN SHANK

[75] Inventor: Michael L. Bodnar, Gastonia, N.C.

[73] Assignee: Easco Corporation, Baltimore, Md.

[21] Appl. No.: 629,503

[22] Filed: Jul. 10, 1984

[51] Int. Cl.[4] .................... B25B 13/46; F16D 11/06

[52] U.S. Cl. .................................... 192/43.1; 81/62

[58] Field of Search .......................... 192/43.1; 81/62; 145/72, 75, 76; 464/37

[56] References Cited

U.S. PATENT DOCUMENTS 1,493,353 5/1924 Leopold .......................... 192/43.1
2,720,296 10/1955 Briglia .......................... 192/43.1
4,529,071 7/1985 Gagnon et al. .................. 192/43.1

*Primary Examiner*—George H. Krizmanich
*Attorney, Agent, or Firm*—Leonard Bloom

[57] ABSTRACT

An improved ratcheting tool has a driven shank rotatably supported fore and aft in the ratchet housing. A reduced-diameter rearwardly-extending portion of the driven shank passes through a central recess in a pivotable cam shifter and is rotatably piloted in a closed cylindrical recess. This recess is formed in the ratchet housing rearwardly of a blind axial bore within which the driven shank is disposed. An intermediate portion of the driven shank is rotatably journaled in the inner annular bearing surface of a collar; and the collar is press-fitted within a counterbore forwardly of a ratchet on the driven shank, thereby retaining the driven shank in the ratchet housing.

1 Claim, 5 Drawing Figures

RATCHETING TOOL WITH IMPROVED SUPPORT FOR DRIVEN SHANK

CROSS REFERENCE TO RELATED APPLICATION(s)

The present invention constitutes an improvement to the ratcheting tool disclosed in copending application, Ser. No. 395,810 filed July 6, 1982, and assigned to the assignee of the present invention, and issued on July 16, 1985 as U.S. Pat. No. 4,529,071.

FIELD OF THE INVENTION

The present invention relates to a hand-held portable ratcheting tool for use by mechanics, hobbyists and do-it-yourselfers; and more particularly, to a ratcheting tool having improved support for the driven shank.

BACKGROUND OF THE INVENTION

In the aforesaid copending application, a ratcheting tool is disclosed of the type wherein a handle is affixed to a ratchet housing. The ratchet housing has a blind axial bore and a counterbore formed therein. A driven shank has an enlarged rearward position formed with a ratchet. A pivotable cam shifter is disposed in the bottom of the blind axial bore rearwardly of the ratchet. A pin is carried by the cam shifter and extends radially thereof through an arcuate slot in the ratchet housing. A selector button is mounted on the pin, and a spinner is carried by the driven shank and rotatably surrounds the ratchet housing forwardly of the selector button. A thrust ball is located in a central recess in the cam shifter rearwardly of the ratchet on the driven shank.

SUMMARY OF THE INVENTION

In accordance with the teachings of the present invention, the thrust ball is deleted and the driven shank has a reduced-diameter rearwardly-extending cylindrical portion. This portion of the shank passes through the central recess in the cam shifter and is rotatably piloted in a closed cylindrical recess formed in the ratchet housing rearwardly of the bore and in communication therewith. The driven shank has an intermediate portion forwardly of the ratchet and journaled within the inner annular bearing surface of the collar. With this arrangement, the driven shank is rotatably supported fore and aft in the ratchet housing. The ratchet housing comprises a die-casting, wherein the concentricities between the closed cylindrical recess and the counterbore in the ratchet housing may be held to relatively close tolerances.

In accordance with the further teachings of the present invention, the pin carried by the cam shifter is received in a blind radial bore in the selector button; and the selector button and the spinner have respective radial extents which are substantially coterminous with each other.

Accordingly, it is an object of the present invention to provide a improved ratcheting tool of the type described, wherein the excellent performance, reliability and manufacturability of the tool are further enhanced.

These and other objects of the present invention will become apparent from a reading of the following specification, taken in conjunction with the enclosed drawings.

GENERAL DESCRIPTION OF THE PREFERRED EMBODIMENT

Figure 1:
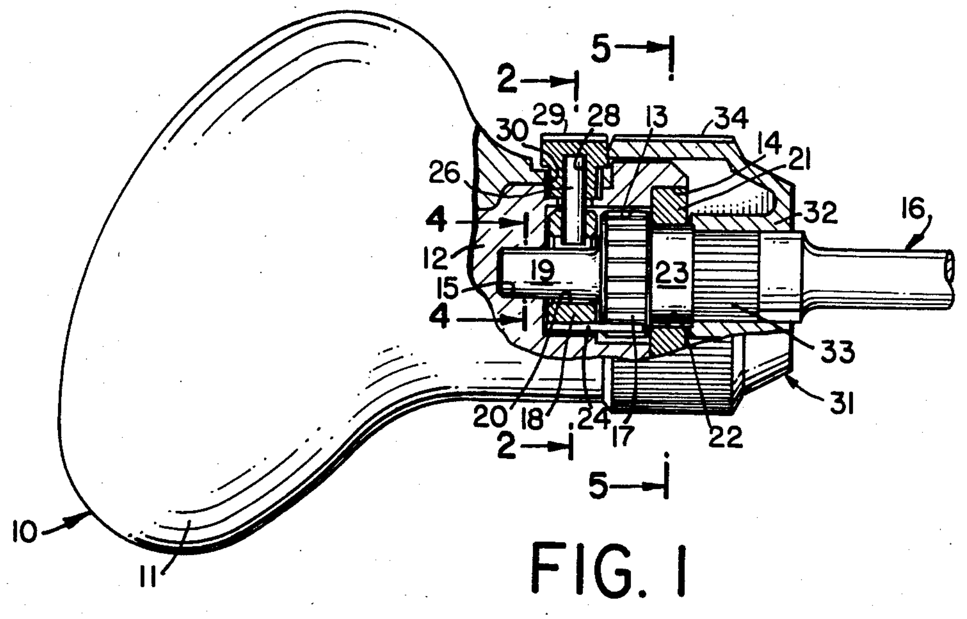
FIG. 1 is a longitudinal section of a portion of the improved ratcheting tool of the present invention.
Figure 2:
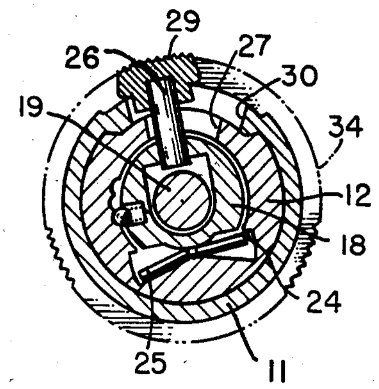
FIG. 2 is a cross-section view, taken along the lines 2—2 of FIG. 1, and showing the ratchet mechanism in one of its ratcheting positions.
Figure 3:
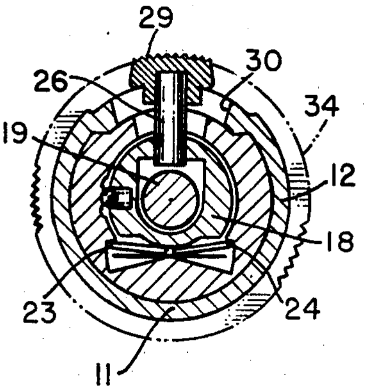
FIG. 3 corresponds to FIG. 2, but illustrates the ratchet mechanism in its intermediate position, wherein the handle of the tool is locked solidly to the driven shank.
Figure 4:
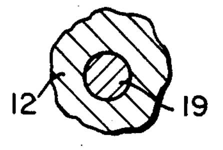
FIG. 4 is a cross-section view, taken along the lines 4—4 of FIG. 1, and showing the reduced-diameter rearwardly-extending portion of the driven shank rotatably piloted in a closed cylindrical recess formed in the ratchet housing rearwardly of the blind axial bore.
Figure 5:
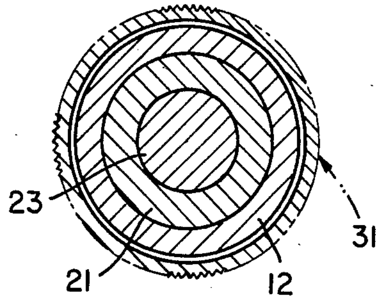
FIG. 5 is a further cross-section view, taken along the lines 5—5 of FIG. 1, and showing an intermediate portion of the driven shank rotatably journaled in the inner annular bearing surface of the collar, the latter axially retaining the driven shank in the ratchet housing.

With reference to the drawings, the improved ratcheting tool 10 of the present invention has a handle 11 affixed to a ratchet housing 12. The ratchet housing has a blind axial bore 13 and a counterbore 14 formed therein. A reduced-diameter cylindrical recess 15 is formed in the ratchet housing rearwardly of the blind axial bore, communicating therewith, and concentrically thereof. A driven shank 16 has an enlarged portion formed with a ratchet 17. A pivotable cam shifter 18 is trapped in the bottom of the blind axial bore, rearwardly of the ratchet. The driven shank further has a reduced-diameter rearwardly-extending portion 19 passing through a central recess 20 in the cam shifter and rotatably piloted in the closed cylindrical recess in the ratchet housing. A collar 21 is press-fitted within the counterbore, forwardly of the ratchet, for axially retaining the driven shank in the ratchet housing. The collar has an inner annular bearing surface 22 for rotatably journaling an intermediate portion 23 of the driven shank forwardly of the ratchet.

With this structural arrangement, the driven shank is rotatably supported fore and aft in the ratchet housing, that is, it is supported at spaced locations axially thereof. Moreover, the ratchet housing comprises a die-casting, and the concentricities between the closed cylindrical recess and the counterbore in the ratchet housing may be held to relatively close tolerances. Thus, the excellent performance, reliability and manufacturability of the ratcheting tool are further enhanced.

With further reference to the drawings, the cam shifter carries respective pawls 24 and 25 which have respective portions extending forwardly thereof for engagement with the ratchet. The cam shifter carries a pin 26 extending radially thereof and passing through an arcuate slot 27 formed in the ratchet housing. The pin is received in a closed radial bore formed in a selector button 29. The selector button is nested within an arcuate slot 30 formed in the handle radially of the arcuate slot in the ratchet housing. A rotatable spinner 31 has a portion 32 press-fitted to a splined portion 33 of the driven shank. The spinner further has a knurled portion 34 rotatably surrounding the ratchet housing forwardly of the selector button.

Preferably, the respective radial extents of the selector button and the spinner, as shown more clearly in FIG. 1, are substantially coterminous with each other. With this arrangement, the selector button will not be engaged inadvertently when the spinner is manually rotated.

Obviously, many modifications may be made without departing from the basic spirit of the present invention. Accordingly, within the scope of the appended claims, the invention may be practiced other than specifically disclosed herein.

What is claimed is:

1. A ratcheting tool comprising a handle, a ratchet housing fixed to the handle, the ratchet housing having a blind axial bore and further having a communicating counterbore formed therein, a driven shank having an enlarged-diameter portion formed with a ratchet, a pivotable cam shifter trapped in the bottom of the blind axial bore rearwardly of the ratchet, a pin carried by the cam shifter and extending radially thereof, the ratchet housing having an arcuate slot through which the pin extends, a selector button mounted on the pin, the selector button having a closed radial bore formed therein for receiving the pin carried by the cam shifter, a spinner carried by the driven shank and rotatably surrounding the ratchet housing forwardly of the selector button, the selector button and the spinner having respective radial extents which are substantially coterminous with each other, respective pawls carried by the cam shifter and extending forwardly therefrom to engage the ratchet, a collar press-fitted within the counterbore forwardly of the ratchet, thereby retaining the driven shank in the ratchet housing, the collar having an inner annular bearing surface, the ratchet housing further having a reduced-diameter closed cylindrical recess formed therein rearwardly of the blind axial bore and communicating therewith, the cam shifter having a central recess formed therein, the driven shank having a reduced-diameter rearwardly-extending cylindrical portion passing through the central recess in the cam shifter and rotatably journaled in the closed cylindrical recess in the ratchet housing, and the driven shank having an intermediate portion forwardly of the ratchet and journaled within the inner annular bearing surface of the collar, whereby the driven shank is rotatably supported fore and aft in the ratchet housing.

* * * * *